Figure 1:
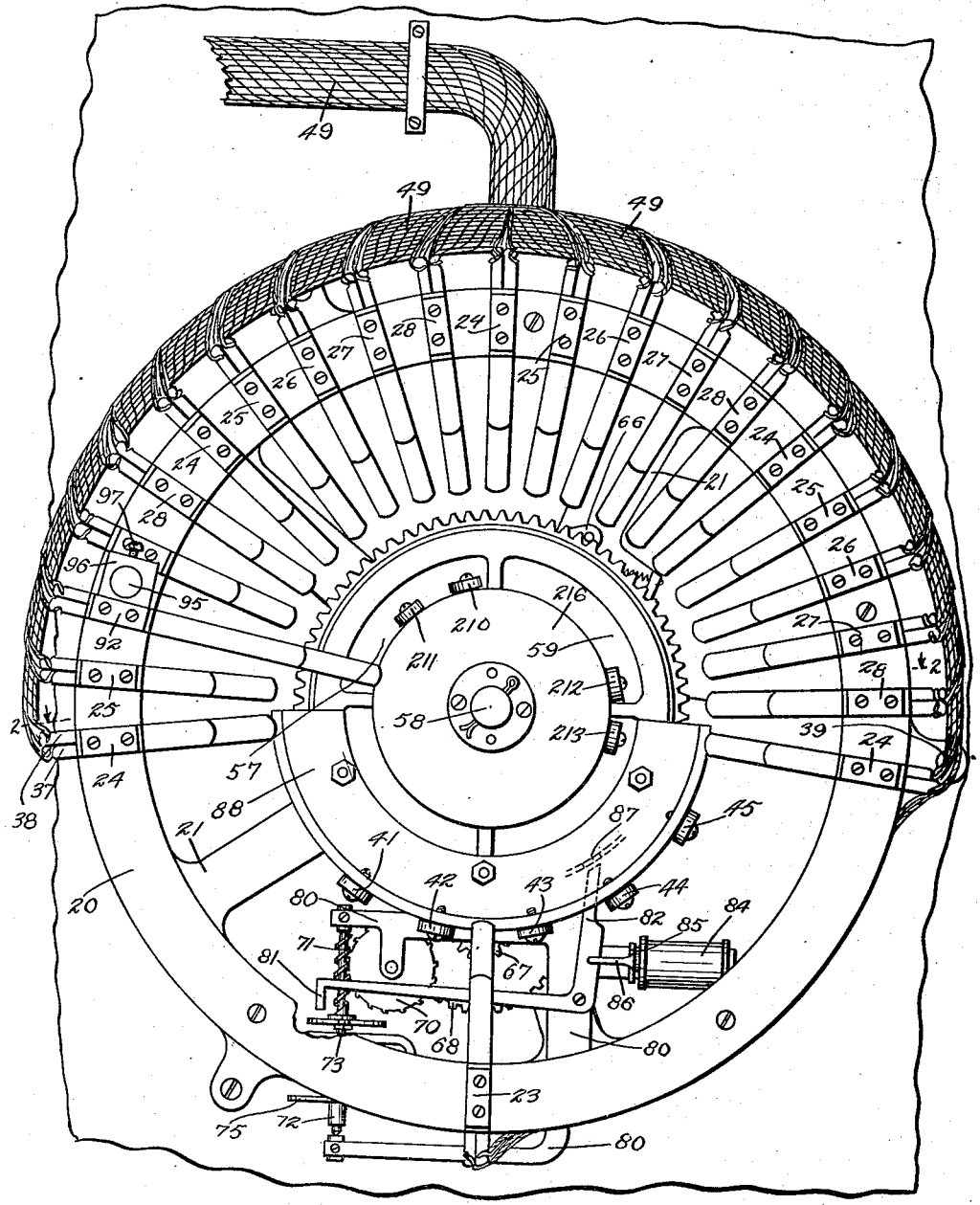

O. H. TRACY.
ALARM SIGNALING APPARATUS.
APPLICATION FILED NOV. 11, 1915.

1,217,241.

Patented Feb. 27, 1917.
7 SHEETS—SHEET 1.

Witnesses:
Alex. Lagaard
H. A. Bowman

Inventor
Oliver H. Tracy.
By P. A. Whitley
his Attorney.

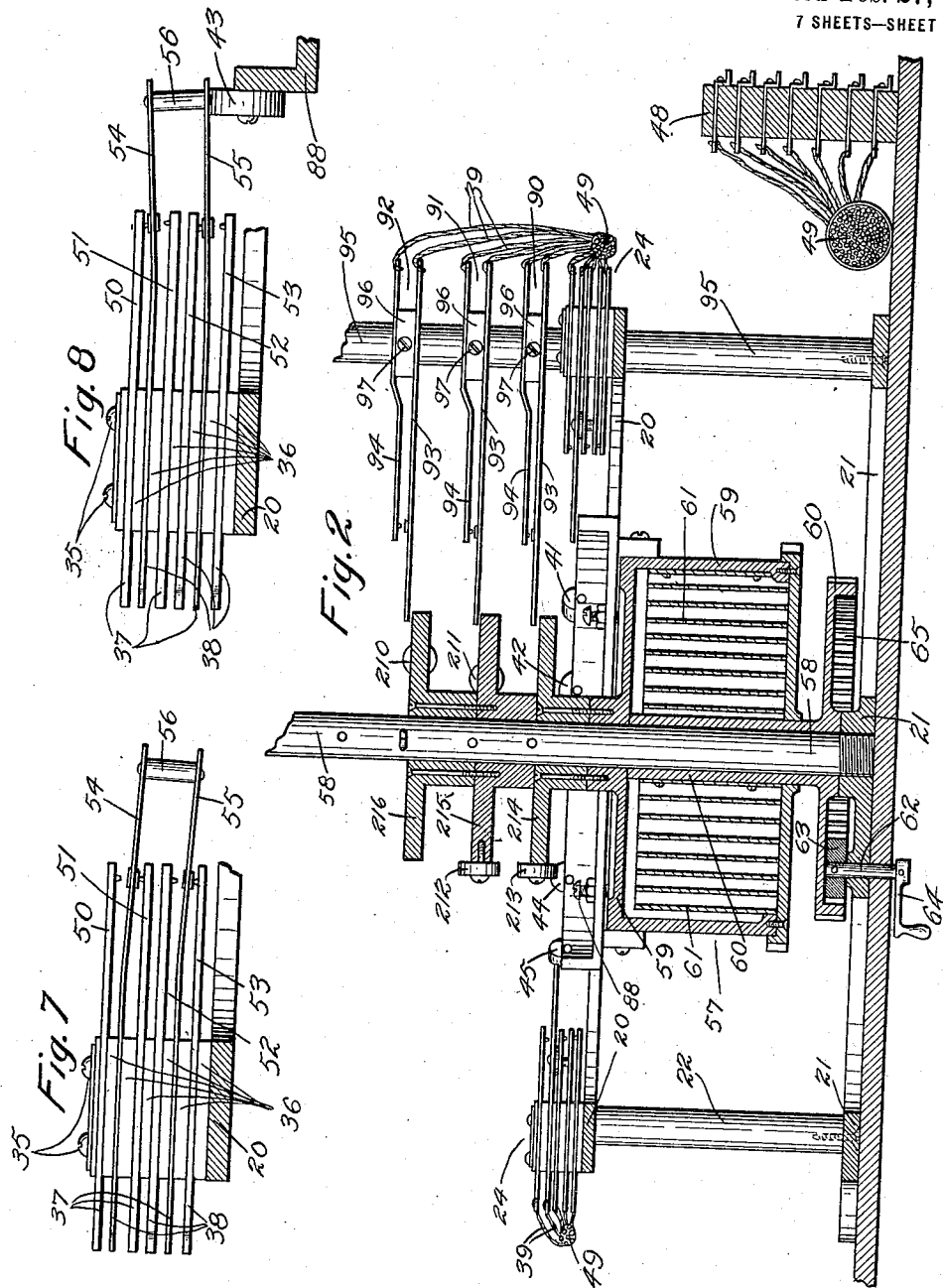

O. H. TRACY.
ALARM SIGNALING APPARATUS.
APPLICATION FILED NOV. 11, 1915.
1,217,241.
Patented Feb. 27, 1917.
7 SHEETS—SHEET 3.
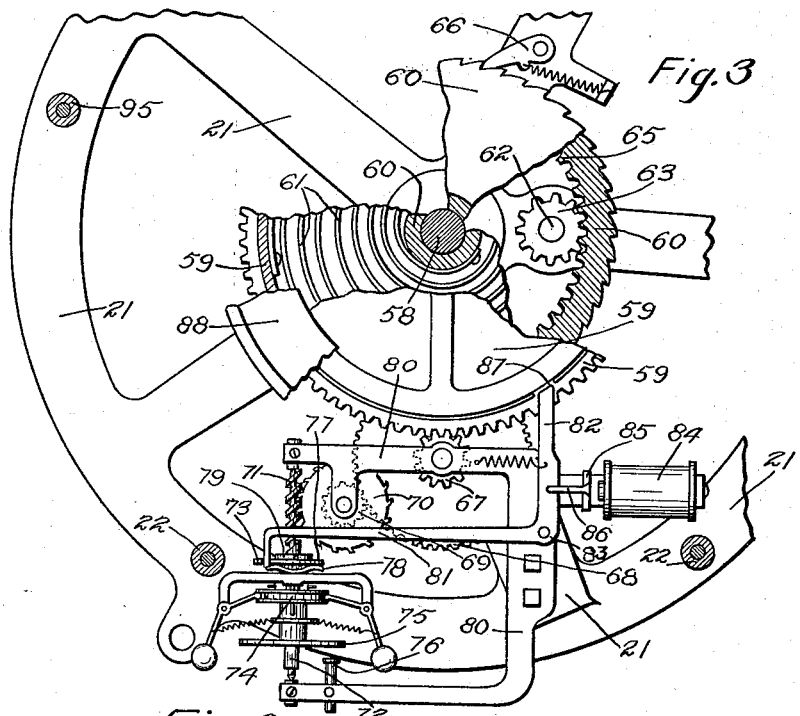
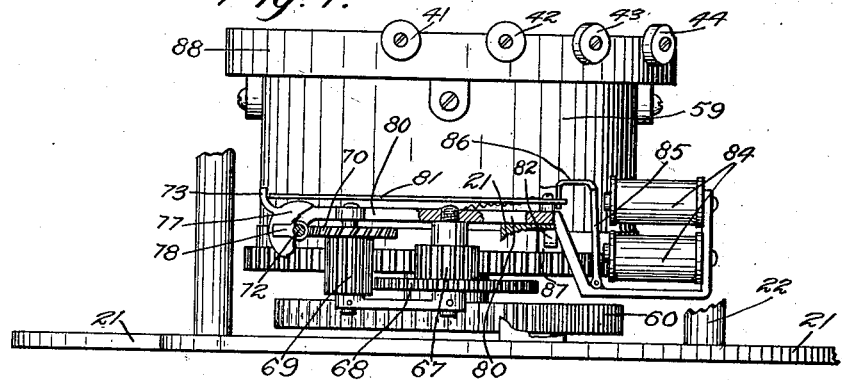
Witnesses:
Alex Fageard
H. Q. Bowman
Inventor:
Oliver H. Tracy.
By F. Q. Whiteley
his Attorney.

O. H. TRACY.
ALARM SIGNALING APPARATUS.
APPLICATION FILED NOV. 11, 1915.

1,217,241.

Patented Feb. 27, 1917.

7 SHEETS—SHEET 4.

Witnesses:
Alex. Lagaard
H. A. Bowman.

Inventor:
Oliver H. Tracy,
By J. J. Whiteley
his Attorney.

O. H. TRACY.
ALARM SIGNALING APPARATUS.
APPLICATION FILED NOV. 11, 1915.

1,217,241.

Patented Feb. 27, 1917.
7 SHEETS—SHEET 7.

Witnesses:
Alex. Fagaard
H. A. Bowman

Inventor:
Oliver H. Tracy.
By F. U. Whiteley
his Attorney.

UNITED STATES PATENT OFFICE.

OLIVER H. TRACY, OF MINNEAPOLIS, MINNESOTA, ASSIGNOR TO THE VOLUNTEER FIREMAN SIGNAL COMPANY, A CORPORATION OF MINNEAPOLIS, MINNESOTA.

ALARM SIGNALING APPARATUS.

1,217,241.  Specification of Letters Patent.  Patented Feb. 27, 1917.

Application filed November 11, 1915.  Serial No. 60,845.

*To all whom it may concern:*

Be it known that I, OLIVER H. TRACY, a citizen of the United States, residing at Minneapolis, in the county of Hennepin and State of Minnesota, have invented certain new and useful Improvements in Alarm Signaling Apparatus, of which the following is a specification.

My invention relates to alarm signaling apparatus and has for its object to provide improved and efficient means for automatically making and breaking circuits to actuate alarms installed and operated in connection with telephone or other lines, as for the purpose of communicating alarms from a central point to diverse points, as well as from diverse points to a central point.

The full objects and advantages of my invention will appear in connection with the detailed description thereof and are particularly pointed out in the claims.

In the drawings, illustrating the application of my invention in one form,—

Figure 9:
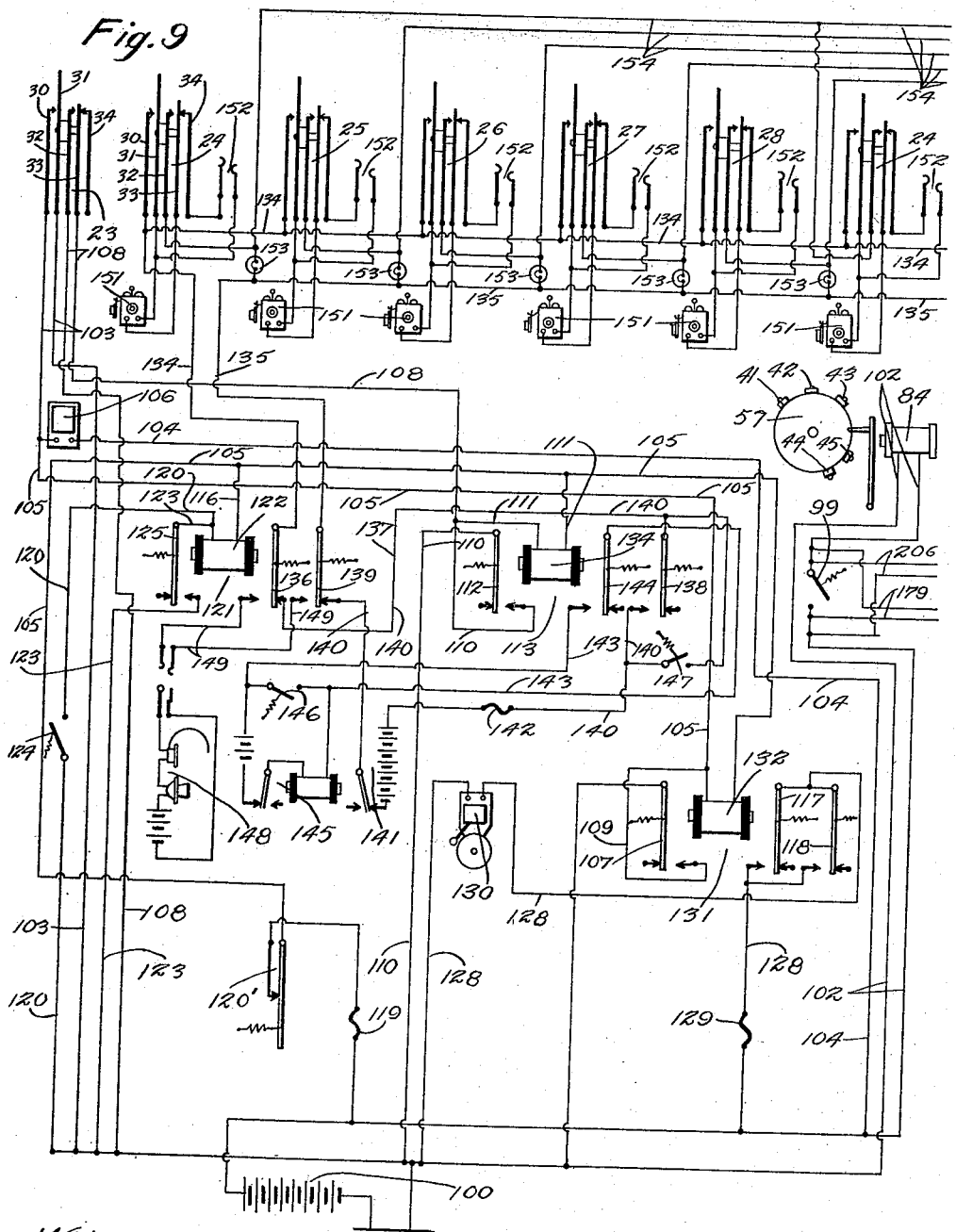
Figure 10:
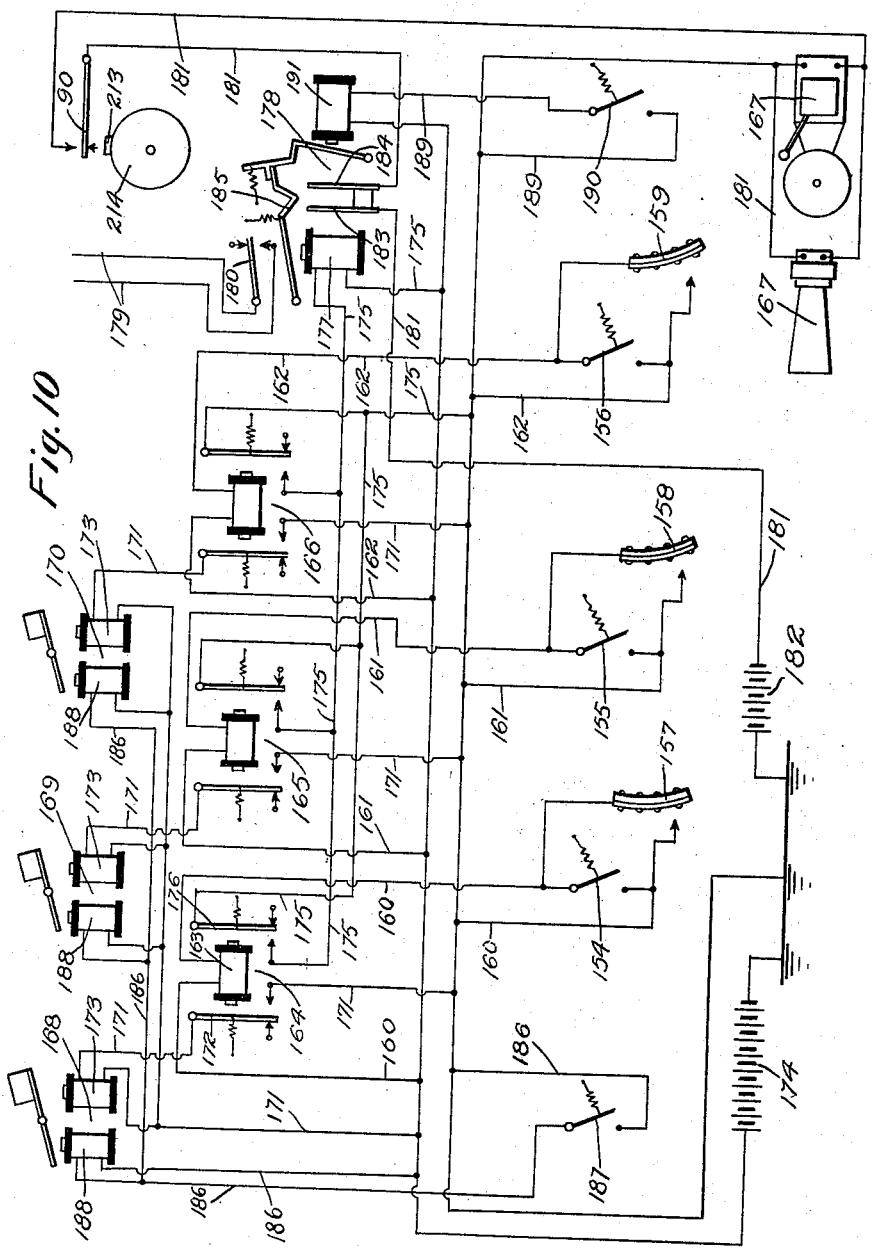
Figure 11:
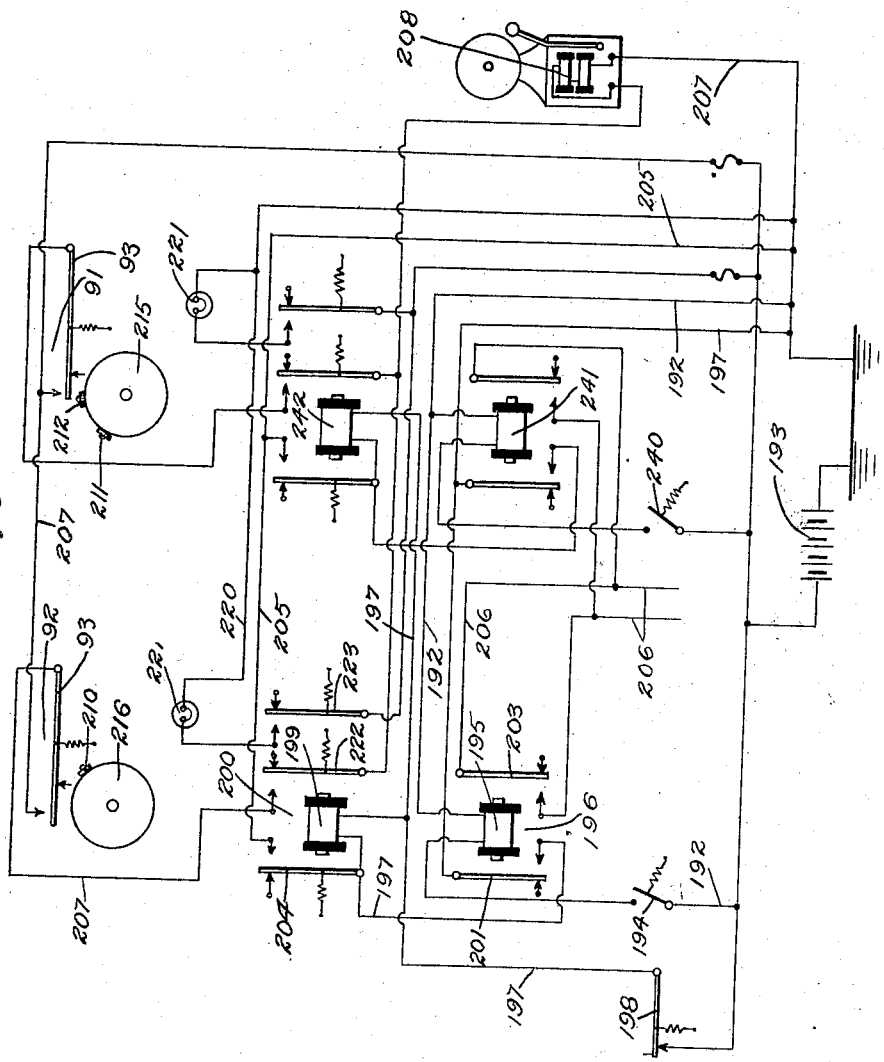
Figure 12:
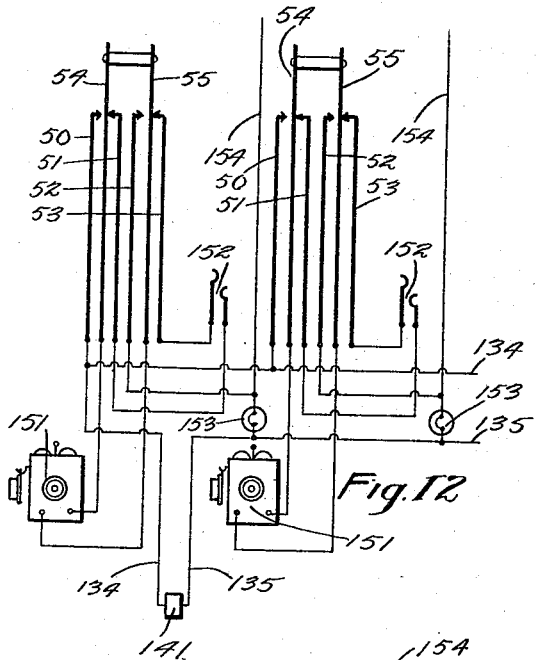
Figure 13:
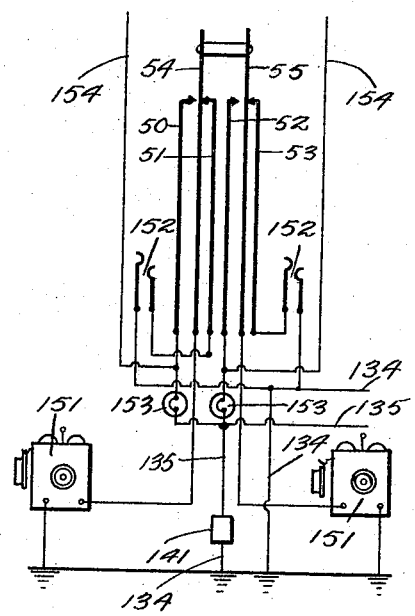
Figure 14:
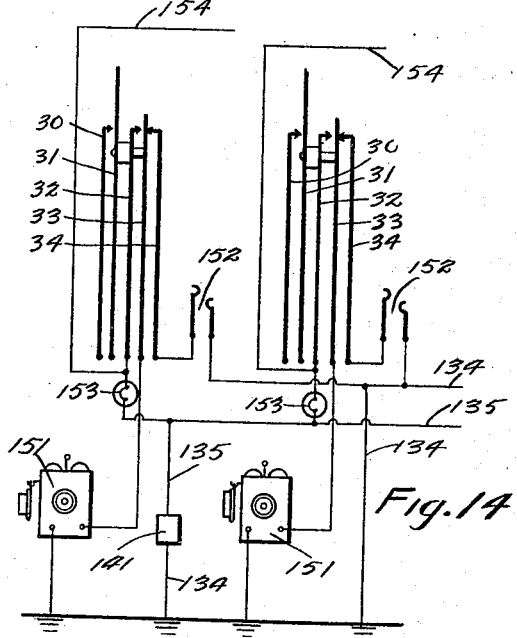

Figure 1 is a plan view of my improved apparatus for making and breaking circuits to actuate alarms. Fig. 2 is a rear elevational sectional view of the same, showing the manner of connecting its lead wires to a terminal rack and is taken on line 2—2 of Fig. 1. Fig. 3 is a fragmentary plan view of some of the parts shown in Fig. 1. Fig. 4 is a front elevational view of the parts shown in Fig. 3. Fig. 5 is a side elevational view of one of the spring contact members drawn to a larger scale, showing the fingers in contact under normal condition. Fig. 6 is a view of the same spring set, showing the fingers in contact when a cam roller has become engaged with one of said fingers. Figs. 7 and 8 are views similar to Figs. 5 and 6 of a modified form of my spring contact member. Fig. 9 is a wiring diagram showing part of my alarm apparatus in conjunction with the lines, bells and other familiar electrical apparatus of a telephone system for the purpose of giving alarm from a central telephone exchange to the members of a volunteer fire department. Fig. 10 is a wiring diagram of another portion of my alarm apparatus designed to give an alarm from a number of outlying points to an adjacent point and also to actuate the apparatus at a central point, shown in Fig. 9, as to inform the clerk of a hotel or the office of a factory of a fire in any of the rooms or departments of said hotel or factory and to actuate the apparatus at a central telephone exchange, shown in Fig. 9, to arouse the members of a volunteer fire department. Fig. 11 is a wiring diagram of a third portion of my alarm apparatus connected with the parts shown in Fig. 9 to give alarm from outlying points to a central point and to actuate the parts shown in Fig. 9, as for giving an alarm at a central telephone exchange from a number of ward boxes and actuating the device for giving a signal to the members of a volunteer fire department. Figs. 12, 13 and 14 are modified forms of connecting the spring contact members shown in Figs. 5, 6, 7 and 8 to the various portions of the equipment.

My contact making and breaking apparatus illustrated in the drawings consists of an upper frame member 20, preferably circular, and a similar lower frame member 21 connected by posts 22 and 95. Frame member 20 supports a plurality of series of radial spring contact members 23, 24, 25, 26, 27, 28, respectively, which are identical, the several members of each series being grouped and connected in a manner and for a purpose as will hereinafter appear. One of these members is shown in Figs. 5 and 6 and consists of five fingers 30, 31, 32, 33 and 34, of different thickness secured to the frame 20 by screws 35 and insulated from each other by blocks 36 of fiber or other insulating material. These fingers terminate in one end in hook-shaped protrusions 37 and 38 to which connecting wires 39 may be soldered, and at their other ends they are supplied with platinum contact points 40 located as shown in Figs. 5 and 6. The fingers 30, 32 and 34 are quite stiff and undergo no appreciable flexion. The finger 31 is a spring and extends beyond the ends of the remaining fingers to engage with any of a number of cam rollers 41, 42, 43, 44 or 45, to be presently described. The finger 33 is also a spring but is not so stiff as the finger 31. The fingers 31 and 33 are held spaced apart by an insulating peg 46 attached to finger 31, which peg slides in an insulating sleeve 47 attached to finger 32. When unrestrained, finger 33 tends to curve upwardly, finger 31 to curve downwardly. In the assembled normal condition of the spring contact members it can then be seen that as the finger 31 is stiffer than finger 33, the latter is forced downward to make contact with the finger 34. When the finger 31 is engaged with any of the cam rollers, to be later explained, as shown in Fig. 6 said finger 31 makes contact with the finger 30 immediately above it and also raises peg 46 to allow spring finger 33 to break contact with finger 34 and make contact with finger 32. The fingers of the spring contact members thus described are connected by means of the wires 39 of a cable 49 to a connecting rack 48, and from there to the various parts of the equipment, as shown in the wiring diagrams to be later described. The modified form of spring contact member shown in Figs. 7 and 8 comprises four rigid fingers 50, 51, 52 and 53, and two spring fingers 54 and 55 connected together by means of an insulating rod 56. Both springs 54 and 55 when normal curve downward and make contact with fingers 51 and 53. When engaged with the cam rollers they are deflected upward and break the previously-formed contacts and make new contacts with fingers 50 and 52. Other spring contact members 90, 91 and 92, consisting of fingers 93 and 94, are insulated from each other and mounted by blocks 96 and screws 97 upon a post 95. They are operated to close contacts by rollers 210, 211, 212 and 213, as will later be explained.

A motor 57 of any desired kind, preferably a spring motor as shown in Figs. 1, 2, 3 and 4, is mounted upon the lower frame member 21 by means of a vertical rod 58 screwed into said frame member 21. The rod 58 carries a toothed drum member 59 and a ratchet wheel member 60 supplied with internal gear teeth 65, both of which members can rotate on said rod. A spiral spring 61 is attached to both members 59 and 60 and may be wound through the ratchet wheel member 60 and a pawl 66 by means of a shaft 62 adapted to receive a hand crank 64 and carrying a pinion 63 meshing with teeth 65 of ratchet wheel 60. Motor 57 drives through gears 67, 68, 69, 70 and 71 pivoted in a bracket frame 80, a shaft 72 supplied with a governor 74, and a release and stop finger 73. Governor 74 embodies a disk 75 engaging with a friction pad 76. Finger 73, integral with a disk 77, is mounted on shaft 72 between a spring 78 and a plate 79 rigidly fastened on the shaft, and hence finger 73 is driven by shaft 72 through the friction between disk 77 and plate 79, which are held in engagement by spring 78. The finger 73 engages with one arm 81 of a bell crank, pivoted to a bracket 80 and 83, and which is oscillated through its other arm 82 by means of an electromagnet 84, an armature 85 and a connecting link 86. Arm 82 is so situated that its extremity can drop into a cavity 87 on the periphery of drum 59 and so cause the arm 81 to engage with the finger 73. It can thus be clearly seen that when the magnet 84 draws up armature 85, arm 82 is withdrawn from slot 87 and arm 81 disengages from finger 73, allowing motor drum 59 to revolve at a speed governed by governor 74. If the current which operates magnet 84 is at any later time cut off, arm 82 rides on the periphery of drum 59, still causing arm 81 to be disengaged from finger 73 and hence permitting the motor 57 to operate until the arm 82 again drops into cavity 87 and causes arm 81 to engage finger 73. The friction drive given to finger 73 allows the motor to continue to rotate for a short time after said finger has been engaged, thus allowing sufficient time to overcome the momentum of the motor parts and to effect retarding and stopping thereof without injury to any of said parts. Drum 59 carries a segment 88 adjustably mounted thereon and said segment provides bearings for the aforementioned rollers 41, 42, 43, 44 and 45. Drum 59 also has attached to it a series of disks 214, 215 and 216 which revolve with it on rod 58 and support the rollers 210, 211, 212 and 213. When the motor 57 is started each of the rollers 41, 42, 43, 44 and 45 passes under each of the springs 31 of the contact members 23, 24, 25, 26, 27, 28, causing contacts in each case to be made and broken once by said roller. At the same time roller 213 passes under spring 93 of member 90, rollers 211 and 212 pass under spring 93 of member 91 and roller 210 passes under spring 93 of member 92, causing contacts in each case to be made once by each roller for every revolution of the drum 59. The drum comes to rest at the end of a complete revolution provided armature 85 has been released when engaging end of arm 82 drops into cavity 87 and can only be rotated farther by another operation of armature 85. From this organization of rollers and contact members the desired signals are given in the sequence and order which best serves the purposes for which the apparatus is used.

The organization of circuits controlled by the above described apparatus and including the usual line and ringing circuits of a telephone system together with other familiar signaling apparatus and the relations of said circuits to the sets of signals or alarms to be given, will now be described. The portion of the same which signals a number of outlying points from a central point, for example, the members of a volunteer fire department, will be described first.

The functions of the apparatus involved in this portion of the system are as follows. The telephone operator upon receiving a telephoned message pushes a button 99 and so starts motor 57. Motor 57 successively closes spring contact members 23, 24, 25, 26, 27, 28, etc. The spring contact member 23 controls a buzzer 106 and two relays 113 and 131. Buzzer 106 informs the telephone operator when the contact member 23 is closed. Relay 131 operates a general alarm 130, which may be located in any public place, and relay 113 cuts in the telephone station ringing set 145 and 141. An operator's switch 124 operates a relay 121 which cuts out the ringing set 145 and 141 and throws in a telephone set 148, by which the operator can speak to the parties signaled. Successive closing of spring contacts 24, 25, etc., successively throws the ringing apparatus 145 and 141 or the talking set 148 upon the parties' lines, thus giving them the required signals. The whole device so described is restored through an operator's switch 120'. All this takes place in the following manner:

A battery 100 is grounded and furnishes the power to release my contact making and breaking apparatus and to operate all the auxiliary apparatus used in connection with this portion of the system. A circuit 102 from battery 100 passes through a spring push switch 99, or other parallel circuits 206 and 179, to be later described, and through the release magnet coil 84 of my machine to ground. When circuit 102 is completed through switch 99 by the telephone operator, or by the devices shown in Figs. 10 and 11 through parallel circuits 179 and 206, magnet 84 is actuated and releases motor 57, rotating the drum 59. Rollers 41, 42, 43, etc., now successively raise the springs 31 of the spring contact members 23, 24, 25, etc. Spring contact member 23 is first engaged, and this member forms the master key of the group. A grounded circuit 103 passes to fingers 30 and 31 of contact member 23 and is normally open through the same. Beyond said contact member 23 circuit 103 divides into two parallel circuits 104 and 105, which both connect with battery 100. Circuit 104 embraces the buzzer 106 and circuit 105 passes through the electromagnet coil 132 of relay 131, through the normally-closed restoring switch 120' and through the fuse 119 to battery 100. It will be noted that circuit 105 has three branch circuits 109, 111 and 116, which communicate with the electromagnet coils 132, 122 and 134 of relays 131, 113 and 121, respectively. Circuit 109 passes through an armature 107 of relay 131, through the open circuit of said armature to ground. Circuit 111 passes through coil 134 and then divides into the parallel circuits 110 and 108, of which 108 passes through the fingers 32 and 33 of contact member 23 to ground and circuit 110 passes through an armature 112 of relay 113 and through the open contact of said armature to ground. In a similar manner circuit 116 passes through coil 122 of relay 121 and divides into two circuits 120 and 123. Circuit 120 passes through a spring push switch 124 to ground, and circuit 123 passes through an armature 125 of relay 121 and through the open contact of said armature to ground. All the circuits passing through the relays 113 and 121 are normally open, as can be clearly seen. When one of the rollers 41, 42, 43, etc., engages with finger 31 of contact member 23, complete circuits through circuits 103 and 105 and through circuits 103 and 104 are established through fingers 30 and 31 of said contact member 23, whereupon the buzzer 106 is actuated during the period of time its circuit is closed and the electromagnet 132 of relay 131 is energized through its armatures during the same time. The movement of armature 107 of relay 131 completes and maintains circuit 109, providing circuit 105 beyond electromagnet 132 with two grounds as long as contact member 23 is closed. When contact member 23 is opened the ground through circuit 109 is alone maintained by means of the current supplied through said circuit 109. Simultaneously a circuit 128, passing from battery 100 through a fuse 129, through the armatures 117 and 118 in multiple of relay 131 through the open contacts of said armatures and through a gong 130 to ground, is closed, setting in action said gong. When the circuit 105 is broken through the restoring switch 120' all the relays, 121, 113 and 131 will be restored and the gong 130 will cease to ring. Gong 130 is a general central alarm and may be placed in any convenient place, and, if necessary, several such gongs may be operated in parallel on the same circuit 128. The above described operation of contact member 23 also completes circuit 108 and momentarily permits flow of current from battery 100 through circuit 105, through fuse 119, through restoring switch 120', through circuit 111, through the magnet coil 134, through circuit 108 and through contact member 23 to ground. This actuates relay 113, which draws up its armatures. Armature 112 of this relay now completes circuit 110 and the armatures of relay 113 are now held drawn up by the current supplied through the circuits 105, 111 and 110. An operating line 134—135 connects with the telephone lines of the desired parties in a way which will be later described, and is connected with the auxiliary apparatus as follows: Lead 134 passes through an armature 136 of relay 121, through the closed contact of said armature, through circuit 137 and to an armature 138 of relay 113. Lead 135 passes through an armature 139 of relay 121, through the closed contact of said armature, through circuit 140, through a central station ringing set 141, and through a fuse 142 to the closed contact of armature 138. The interrupter circuit 143 of a ringing interrupter 145 passes through an armature 144 of the relay 113, and is broken at the open contact of said armature. When relay 113 is operated circuit 143 through the ringing interrupter 145 is closed and the ringing current through circuit 140 is thrown upon the operating line 134—135. The two shunting switches 146 and 147 are used by the telephone operator when she wishes to use the ringing equipment for purely telephone purposes. The regular complete telephone set 148 of the telephone operator can be plugged in on a line 149 connected to the open contacts of armatures 136 and 139. When the switch 124 is closed current is supplied to and maintained in relay 121 similarly to the method used with relay 113. This in effect switches the line 134—135 from the ringing circuit 140 to the talking circuit 149, allowing the telephone operator to speak to the desired parties. If a momentary transition is desired it will become necessary to eliminate circuit 123, for then talking on line 134—135 can only take place when the operator keeps switch 124 closed. The restoring of all the parts except motor 57, to their normal condition takes place through the operator's restoring switch 120', which breaks the circuit 105, depriving relays 131, 113 and 121 of current.

The method of breaking the regular telephone circuits and ringing in upon the desired lines takes place as follows: All the contact members 24, 25, 26, etc., are identical and are connected similarly. Finger 30 connects with lead 134. Fingers 31 and 33 connect with the parties' telephone 151, and fingers 31 and 34 connect with the parties' switchboard plugs 152. Finger 32 connects with a lamp 153 and also with the same finger of every sixth, eleventh, thirteenth, etc., contact member through lead 154, as, for example, finger 32 of contact member 24 connects with lamp 153 of the same member and with fingers 32 of all other members 24, etc. It will be observed that the operating line circuit is completed through the lamps 153 to line 135, there being as many lamps as rollers 41, 42, 43, etc. When the rollers pass the first contact members the later ones complete their respective circuits through the same lamps by means of the leads 154. Hence when any of the rollers 41, 42, 43, etc., engage with any of the fingers 31 of the last-named contact members it can readily be seen that the regular telephone circuit is switched from the switchboard plug to the operating line 134—135, where the operator may communicate by signal or speaking to the selected parties, or the same done automatically, it being understood that the apparatus normally is set to send ringing signals automatically. This portion of the system is started by switch 101 or the automatic devices on circuits 179 or 206 and restored by switch 120'. It can be used for speaking or selective ringing signaling. Where there are ringing circuits on both sides of a telephone line to ground, my apparatus can be connected to ring on either or both sides of the line, as clearly shown in Fig. 14, where the connections are essentially the same as those shown in Fig. 9 except that a ground is used in place of one side of the line. The form of spring contact member shown in Figs. 7 and 8 may be used on my machine for the purpose set forth in Fig. 9, in place of the member illustrated in Figs. 5 and 6. A diagrammatic sketch of this substitution is shown in Fig. 12, the only difference being that both sides of the telephone line are broken and switched instead of only one, as with the previous member. When such a spring contact member is employed in connection with a grounded telephone line only three fingers of said member need be employed and the number of telephone lines involved may thus be doubled, increasing the capacity of the machine. Such an arrangement is clearly shown in Fig. 13.

A second portion of my alarm signaling apparatus is shown in Fig. 10 and gives individual signal alarms from outlying points, as the rooms of a hotel or building to a local point, as the office of said building or hotel, and also sets in operation the apparatus shown in Fig. 9. A number of hand switches 154, 155 and 156 and thermal switches 157, 158 and 159 are distributed about the building to be protected. They are directly connected from a battery 158 by circuits 160, 161 and 162 through magnet coils 163 of individual relays 164, 165 and 166 to ground. These relays control jointly local alarms 167, which may also be distributed about the building. Alarms 167 consist of several gongs or horns operated in parallel on the same circuit. Relays 164, 165 and 166 control separately corresponding annunciators 168, 169 and 170 located at the central office as follows. Since the connection and operation of each unit of relays, annunciators and switches is the same, only that of one unit will be explained. When either of switches 154 or 157 is closed it completes the circuit 160 and so actuates the relay 164. Relay 164 closes a grounded circuit 171 through one of the armatures 172 of said relay, through the operating coil 173 of annunciator 168 to a high voltage battery 174, which causes the register of said annunciator to be indicated. Relay 164 also completes a second grounded circuit 175, passing through the other of its armatures 176, through the actuating coil 177 of a Sechrist switch 178 to ground, causing said Sechrist switch to close two independent circuits as follows: The circuit 179 passes from an armature 180 of said Sechrist switch to shunt the switch 99, shown in Fig. 9, and completes circuit 102 of the same Fig. 9 to operate the electromagnet release coil 84 and set motor 57 in operation. A second circuit 181 receives its current from a low voltage battery 182 and passes through the contact fingers 183 and 184 of Sechrist switch 178, through spring contact member 90, through the horns or gongs 167 connected in parallel, and then to ground and is partially completed through an armature 185 of the same said Sechrist switch. Armatures 180 and 185 must move together, as will become evident. When roller 213 on disk 214 passes under spring contact member 90 the circuit 181 is fully completed during such periods, and the alarm apparatuses 167 are periodically operated to give any desired signals. It hence becomes clear that the closing of any of switches 154, 155, 156, 157, 158 or 159 operates the corresponding annunciator drop as well as the periodical alarm 167. Means for restoring the apparatus at the office is provided as follows: A circuit 186 passes from ground through a restoring switch 187, through all of the restoring magnets 188, connected in parallel, of the annunciators 168, 169 and 170 to battery 174. Closure of switch 187 hence actuates coils 188 and so restores the annunciators. A circuit 189 passing from ground through a restoring switch 190, through the restoring coil 191 of the Sechrist switch 178 release armatures 180 and 185 of said switch, breaking circuits 179 and 181 and stopping the motor 57 and the alarm apparatus 167.

A third portion of my alarm signaling apparatus is shown in Fig. 11. This portion gives an individual alarm signal from any outlying points, as a number of ward boxes, to a central point, as the chief of the fire department, and sets in operation the apparatus shown in Fig. 9. A circuit 192 passes from a grounded battery 193 through a ward switch 194, through the electromagnet coil 195 of a relay 196 to ground. The function of relay 196 is to close two circuits; one, circuit 197 from battery 193 through a closed restoring switch 198, through the electromagnet coil 199 of a second relay 200, through one of its armatures 201 to ground; and the other, circuit 206 shunted across switch 99 of Fig. 9 to release motor 57 through the other of its armatures 203. Current through coil 199 of relay 200 is maintained, after switch 194 is abandoned, by means of an armature 204 of said relay which establishes the required ground through an armature 204 and a circuit 205. Relay 200 completes a circuit 220 through an armature 223 operating a signal lamp 221, and also partially completes a circuit 207 through an armature 222, operating a single stroke gong 208 similar to alarm apparatus 167 in Fig. 10. As in Fig. 10, motor 57 causes the fingers on a contact member 91 to periodically actuate gong 208 to give the individual signal of the corresponding ward. Each ward requires duplicate apparatus, including additional ward switches 240, relays 241 and 242, spring contact members 91 and rotating disks 215, which are similarly connected to similar contact members of my contact making and breaking machine and to the alarm 208, as is clearly shown in Fig. 11. The restoring of this portion of my system takes place through the closed switch 198 located at the chief's office. When sufficient alarm has been given he can stop the apparatus and restore it by this means. Switch 120', shown in Fig. 9, may also be located at the chief's office, whereby he terminates the signals given to the volunteer firemen, or they may both be in charge of the telephone operator.

I claim:

1. An automatic telephone signaling machine comprising a plurality of contact members, each member being composed of three sets of contact springs, one set being connected in a line circuit and a second set in a ringing circuit of the telephone system, and a third set being movable contacts connected in the line circuit of the telephone system and normally held so as to close said line circuit, a device mounted for rotation in proximity to parts of said movable contacts, means on and movable with said device to engage said contacts and move them to break the line circuits and close the ringing circuits, means to rotate the device, an operating line for controlling the line and ringing circuits, and means controlled by the operator for switching from the ringing to the telephone line while said device is being rotated, to enable the operator to talk through all of said line circuits.

2. An automatic telephone signaling machine comprising a plurality of contact members each having respective connection with the line and ringing circuits of a corresponding number of telephones of the system and each having movable contacts for breaking the line connection and closing the ringing circuits, a single contact member, an operating line for said ringing circuits, a relay normally breaking said operating line, a circuit for operating said relay to close said operating line and render the same effective said last-named circuit being connected with said single contact member, a movable contact in said single member for closing said last-named circuit, a rotatable device having means thereon successively to operate said single contact member and said plurality of contact members, and means to rotate the device.

3. An automatic telephone signaling machine comprising a plurality of contact members each having respective connection with the line and ringing circuits of a corresponding number of telephones of the system and each having movable contacts for breaking the line connection and closing the ringing circuits, a single contact member, an operating line for said ringing circuits, a relay normally breaking said operating line, a circuit for operating said relay to close said operating line and rendering the same effective, said last-named circuit being connected with said single contact member, a movable contact in said single member, a rotatable device having means thereon successively to operate said single contact member and said plurality of contact members, means to rotate the device, and an operator's switch for throwing the operating line from the ringing circuit and into the talking circuit.

4. An automatic telephone signaling machine comprising a plurality of contact members each having respective connection with the line and ringing circuits of a corresponding number of telephones of the system and each having movable contacts for breaking the line connection and closing the ringing circuits, a single contact member, an operating line for said ringing circuits, a relay normally breaking said operating line, a circuit for operating said relay to close said operating line and render the same effective, said last-named circuit being connected with said single contact member, a movable contact in said single member for closing the last-named circuit, a rotatable device having means thereon successively to operate said single contact member and said plurality of contact members, means to rotate the device, a general alarm mechanism, a normally open circuit for operating the same, and means for closing said circuit when the single contact member is operated.

5. An automatic telephone signal apparatus comprising a plurality of contact members each having respective connection with the line and ringing circuits of a corresponding number of telephones of the system and each having movable contacts for breaking the line connection and closing the ringing circuits, a single contact member, an operating line for said ringing circuits, a relay normally breaking said operating line, a circuit for operating said relay to close said operating line and actuate a ringing set, said last-named circuit being connected with and closed by said single contact member, a rotatable device having means thereon successively to operate said single contact member and said plurality of contact members, a motor to rotate said device, a catch to release said motor, an electromagnet to operate said catch, a circuit and a switch to actuate said electromagnet, a talking circuit, a relay for switching said operating line from said ringing circuit to said talking circuit, a circuit with an operator's switch for controlling said switching relay, a general alarm, a normally-open circuit for actuating said alarm, a relay for closing said last-named circuit, means rendered operative by said single contact member for operating said alarm relay, and a switch for restoring and releasing all of said apparatus.

6. An automatic telephone signaling apparatus comprising a plurality of contact members each having respective connection with the line and ringing circuits of a corresponding number of telephones of the system and each having movable contacts for breaking the line connection and closing the ringing circuits, a single contact member, an operating line for said ringing circuits, a relay normally breaking said operating line, a circuit for operating said relay to close said operating line and actuate a ringing set, said last-named circuit being connected with and closed by said single contact member, a rotatable device having means thereon successively to operate said single contact member and said plurality of contact members, a motor to rotate said device, a catch to release said motor, an electromagnet to operate said catch, a circuit and a switch to actuate said electromagnet, a talking circuit, a relay for switching said operating line from said ringing circuit to said talking circuit, and a circuit with an operator's switch for controlling said switching relay.

7. An automatic telephone signaling apparatus comprising a plurality of contact members each having respective connection with the line and ringing circuits of a corresponding number of telephones of the system and each having movable contacts for breaking the line connection and closing the ringing circuits, a single contact member, an operating line for said ringing circuits, a relay normally breaking said operating line, a circuit for operating said relay to close said operating line and actuate a ringing set, said last-named circuit being connected with and closed by said single contact member, a rotatable device having means thereon successively to operate said single contact member and said plurality of contact members, a motor to rotate said device, a catch to release said motor, an electromagnet to operate said catch, a circuit and a switch to actuate said electromagnet, a general alarm, a normally-open circuit for actuating said alarm, a relay for closing said last-named circuit, means rendered operative by said single contact member for operating said alarm relay, and a switch for restoring and releasing all of said apparatus.

8. An automatic telephone signaling apparatus comprising a plurality of contact members, each member being composed of three sets of contact springs, one set being connected in a line circuit and a second set in a ringing circuit of the telephone system, and a third set being movable contacts connected in the line circuit of the telephone system and normally held so as to close said line circuits, a device mounted for rotation in proximity to parts of said movable contacts, means on and movable with said device to engage said contacts and move them to break the line circuits and close the ringing circuits, a series of independent movable contact members each being composed of one set of contacts, circuits connecting said contacts to a local alarm, a series of devices mounted for rotation in proximity to parts of said independent movable contact members, means on said devices to engage parts of said independent contact members and move them to close aforementioned circuits and give individual signals on said local alarms, and means to rotate said devices.

9. An automatic telephone signaling apparatus comprising a plurality of contact members, each member being composed of three sets of contact springs, one set being connected in a line circuit and a second set in a ringing circuit of the telephone system, and a third set being movable contacts connected in the line circuit of the telephone system and normally held so as to close said line circuits, a device mounted for rotation in proximity to parts of said movable contacts, means on and movable with said device to engage said contacts and move them to break the line circuits and close the ringing circuits, a series of independent movable contact members each being composed of one set of contacts, a series of devices mounted together with the aforementioned devices for rotation in proximity to parts of said independent movable contact members, means on said devices to engage parts of said independent contact members, and move them, normally-inoperative means to rotate all said devices together, a normally-broken circuit through one of said independent contact members for operating a local alarm, means including a plurality of switches in a plurality of parallel circuits for closing said last-named circuit, a plurality of annunciators operated by said circuit, an independent circuit for rendering said rotating means operative, and means for restoring and releasing all said apparatus.

10. An automatic telephone signaling apparatus comprising a plurality of contact members, each member being composed of three sets of contact springs, one set being connected in a line circuit and a second set in a ringing circuit of the telephone system, and a third set being movable contacts connected in the line circuit of the telephone system and normally held so as to close said line circuits, a device mounted for rotation in proximity to parts of said movable contacts, means on and movable with said device to engage said contacts and move them to break the line circuits and close the ringing circuits, a series of independent movable contact members each being composed of one set of contacts, a series of devices mounted together with the aforenamed devices for rotation in proximity to parts of said independent movable contact members, means on said devices to engage parts of said independent contact members, and move them, normally-inoperative means to rotate all said devices together, a local alarm, a plurality of normally-open circuits through a plurality of said independent contact members for operating said alarm, means for selectively closing said circuits from a plurality of separated points, and manually-controlled means to restore and release all the said apparatus.

11. An automatic telephone signaling apparatus comprising a plurality of contact members each having respective connection with the line and ringing circuits of a corresponding number of telephones of the system and each having movable contacts for breaking the line connection and closing the ringing circuits, a single contact member, a general alarm rendered operative by said single contact member, a series of independent movable contact members each being composed of one set of contacts, a signaling alarm located in a fireman's control station, a plurality of said independent contact members for operating said alarm, means for selectively closing said circuits from a plurality of separated points, a local alarm in a hotel or other building, a normally-broken circuit through one of said independent contact members for operating said local alarm, means including a plurality of switches and a plurality of parallel circuits for closing said last-named circuit, a rotatable device having means thereon to operate in timed order said plurality of contact members, said single contact member and said independent contact members, a motor to rotate said device, a catch to release said motor, means including an electromagnet and a normally-open circuit to operate said catch, means for closing said circuit comprising either a hand-operative switch or a switch automatically controlled for operation through the closing of the circuits for actuating the said signaling alarm or the said local alarm.

In testimony whereof I affix my signature in presence of two witnesses.

OLIVER H. TRACY.

Witnesses:
ALEX. LAGAARD,
H. A. BOWMAN.

Copies of this patent may be obtained for five cents each, by addressing the "Commissioner of Patents, Washington, D. C."